(12) United States Patent
Roberts

(10) Patent No.: US 9,306,697 B2
(45) Date of Patent: Apr. 5, 2016

(54) SYSTEM AND METHOD OF COMPENSATING FOR SPECTRAL EXCURSION

(71) Applicant: Calix, Inc., Petaluma, CA (US)

(72) Inventor: Harold A. Roberts, Excelsior, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 14/319,929

(22) Filed: Jun. 30, 2014

(65) Prior Publication Data

US 2015/0381300 A1    Dec. 31, 2015

(51) Int. Cl.
     *H04J 14/00*          (2006.01)
     *H04J 14/02*          (2006.01)
     *H04B 10/27*         (2013.01)
     *H04B 10/572*        (2013.01)

(52) U.S. Cl.
     CPC ............... *H04J 14/02* (2013.01); *H04B 10/27* (2013.01); *H04B 10/572* (2013.01)

(58) Field of Classification Search
CPC ............... H04B 10/07; H04B 10/0795; H04B 10/17953; H04B 10/07955; H04B 10/07957; H04J 14/0227; H04J 14/0232; H04J 14/0234; H04J 14/0235; H04J 14/0236; H04J 14/0239; H04J 14/0245; H04J 14/0246
USPC ........... 398/66, 67, 68, 69, 70, 71, 72, 33, 34, 398/38, 98, 99, 100, 25, 135, 136, 158, 159, 398/193, 194, 195, 196, 197, 198, 162, 79; 370/352, 392, 389, 468, 503
See application file for complete search history.

(56) References Cited

U.S. PATENT DOCUMENTS

| | | | |
|---|---|---|---|
| 6,393,041 B1 | 5/2002 | Sato | |
| 7,502,563 B2 | 3/2009 | Nozue et al. | |
| 8,649,681 B2* | 2/2014 | Ohlen | ............................. 398/72 |
| 2005/0058452 A1 | 3/2005 | Kramer et al. | |
| 2011/0200328 A1* | 8/2011 | In De Betou et al. | ........... 398/38 |
| 2013/0243015 A1 | 9/2013 | Eriksson et al. | |
| 2013/0315585 A1 | 11/2013 | Na et al. | |
| 2014/0233944 A1* | 8/2014 | Vetter et al. | ..................... 398/34 |
| 2015/0063812 A1 | 3/2015 | Dove et al. | |
| 2015/0311669 A1 | 10/2015 | Chuang et al. | |

OTHER PUBLICATIONS

Zou et al., "Narrowly Spaced DFB Array With Integrated Heaters for Rapid Tuning Applications", "IEEE Photonics Technology Letters", May 2004, pp. 1239-1241, vol. 16, No. 5, Publisher: IEEE.

(Continued)

*Primary Examiner* — Hanh Phan
(74) *Attorney, Agent, or Firm* — Fogg & Powers LLC

(57) ABSTRACT

An optical network comprises a plurality of optical network units and an optical line terminal having one or more transmitters and one or more receivers. Each of the one or more transmitters and each of the one or more receivers is configured to operate over a respective wavelength. Each of the optical network units has a respective laser that is optically coupled to a respective one of the one or more transmitters and a respective one of the one or more receivers. The optical line terminal is configured to monitor power levels of respective optical signal burst transmissions from each of the plurality of optical network units and to direct each optical network unit to wavelength bias its respective laser based on the monitored power levels to compensate for a respective wavelength shift experienced by the respective laser during burst transmissions.

20 Claims, 6 Drawing Sheets

(56) References Cited

OTHER PUBLICATIONS

Cheng et al., "Flexible TWDM PON system with pluggable optical transceiver modules", "Optics Express", Jan. 24, 2014, pp. 2078-2090, vol. 22, No. 2, Publisher: Optical Society of America.

U.S. Patent and Trademark Office, "Office Action", "from U.S. Appl. No. 14/465,621", Nov. 19, 2015, pp. 1-20, Published in: US.

Andreoni et al., "A simple system of thermal control and frequency stabilization of solitary diode lasers", "Review of Scientific Instruments", Oct. 2000, pp. 3648-3652, vol. 71, No. 10, Publisher: American Institute of Physics.

* cited by examiner

SYSTEM AND METHOD OF COMPENSATING FOR SPECTRAL EXCURSION

BACKGROUND

For Wavelength-Division Multiplexed (WDM) Passive Optical Network (PON) implementations, such as gigabit passive optical network (GPON), it is generally accepted that it is desirable for the Optical Network Units (ONUs) to have tunable downstream receivers and tunable upstream lasers so that so-called 'colorless' ONUs can be deployed and the inventory complexity implied by colored ONUs can be avoided. As understood by one of skill in the art, colorless ONUs refer to ONUs that are not fixed to a specific wavelength, whereas colored ONUs are configured for a specific wavelength.

While costs have dropped for both tunable receivers and lasers, they still remain significantly more expensive than fixed optical components. In addition, tunable receivers and lasers also suffer from temperature effects which may make it difficult to maintain precise wavelength tuning. Furthermore, lasers used in burst mode suffer from short term wavelength changes from the beginning of the burst until the wavelength stabilizes due to the abrupt injection of current from an off-burst to an on-burst state. Thus, precise tunable optical components are expensive and, if they need to operate in an environment with a wide temperature range, may not even be feasible. However, in order to implement some systems, such as Next Generation (NG)-PON2, low cost precision, tunable ONU optics are desired. NG-PON2 uses a combination of Time Division Multiple Access (TDMA) and WDM which has also been referred to as TWDM-PON. There is currently no market solution to this problem and it is currently an impediment to implementing NG-PON2. In other words, there is no economically feasible solution currently available to provide low cost precision, tunable ONU optics.

SUMMARY

In one embodiment, an optical network is provided. The optical network comprises an optical line terminal having one or more transmitters configured to transmit optical signals and one or more receivers configured to receive optical signals. Each of the one or more transmitters and each of the one or more receivers is configured to operate over a respective wavelength. The optical network further comprises a plurality of optical network units. Each of the optical network units has a respective laser that is optically coupled to a respective one of the one or more receivers in the optical line terminal. The optical line terminal is configured to monitor power levels of respective optical signal burst transmissions from each of the plurality of optical network units and to direct each optical network unit to wavelength bias its respective laser between optical signal bursts based on the monitored power levels to compensate for a respective wavelength shift experienced by the respective laser during burst transmissions.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
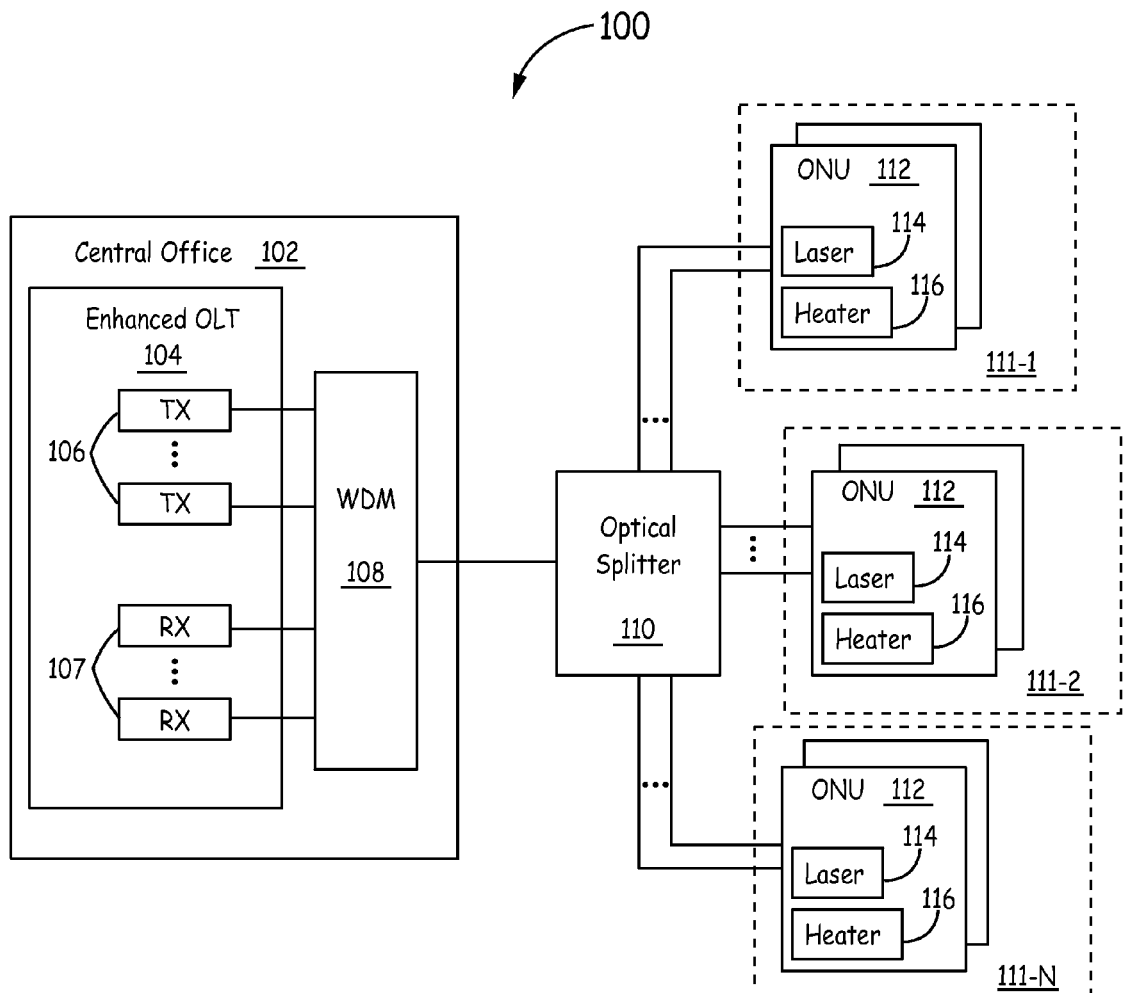
FIG. 1 is a block diagram of one embodiment of an exemplary optical system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of one embodiment of an exemplary optical system 100. Optical system 100 includes a central office 102 having one or more enhanced Optical Line Terminals (OLT) 104. Each enhanced OLT 104 includes a plurality of optical transmitters 106 and a plurality of optical receivers 107. Each transmitter 106 and receiver 107 is operable over a respective wavelength. The enhanced OLT 104 also includes a wavelength division multiplexer (WDM) 108 configured to multiplex the signals from the plurality of transmitters 106 and to separate signals directed to each of the plurality of receivers 107. The WDM 108 outputs the optical signal containing the multiplexed wavelengths from the enhanced OLT 104 to the optical distribution network.

System 100 also includes an optical splitter 110, such as a cyclic array waveguide grating (AWG) located in the optical distribution network. The splitter 110 is configured to provide signals to each of a plurality of optical network units (ONU) 112. Multiple ONUs 112 are configured to operate over the same upstream and/or downstream wavelengths. For example, multiple ONUs 112 transmit optical bursts over the same upstream wavelength using a TDMA scheme to avoid collisions. For example, each ONU 112 in group 111-1 transmits optical bursts over the same upstream wavelength while each ONU 112 in group 111-2 transmits optical bursts over a second upstream wavelength.

In addition, each of the ONUs 112 is a colorless tunable ONU 112. A colorless tunable ONU 112 is an ONU that is not pre-configured to operate over a specific wavelength, but can be tuned to a desired wavelength. The cost of manufacturing the ONUs 112 is reduced, in some embodiments, by configuring the ONUs 112 to tune over a limited range of wavelengths. For example, in some embodiments, each ONU 112 is only able to tune over a 4 nanometer band as opposed to tuning over the frequency band available to the optical transmitters 106, such as the entire C band (1530-1565 nm) or L band (1565-1625 nm). Limiting the range of tunable wavelengths reduces the costs involved in the optics of the ONU 112. In addition, in some embodiments, each ONU does not include a thermal electric cooler (TEC), but only a heater 116 which further reduces costs. As understood by one of skill in the art, a TEC can be used to adjust the wavelength used by the ONU 112. However, omitting the TEC can further reduce the cost of manufacturing the ONUs 112. Thus, the cost of manufacturing the ONUs 112 is lower than the cost of manufacturing conventional precision, tunable ONUs.

In addition, each ONU 112 is configured to scan downstream wavelengths to identify a signal from OLT 104. As used herein, downstream refers to signals traveling in a direction from the OLT 104 to the ONUs 112, whereas upstream refers to signals traveling in a direction from the ONUs 112 toward the OLT 104. Similarly, in the upstream, each ONU 112 incrementally transmits on an upstream wavelength until receiving instructions from the OLT 104 to stop incrementing the wavelength. The ONUs 112 can increment the wavelength by adjusting current to a respective heating element or heater 116 within the ONU 112. By changing the temperature through the respective heater 116, the wavelength of the transmitted light is changed.

Figure 2:
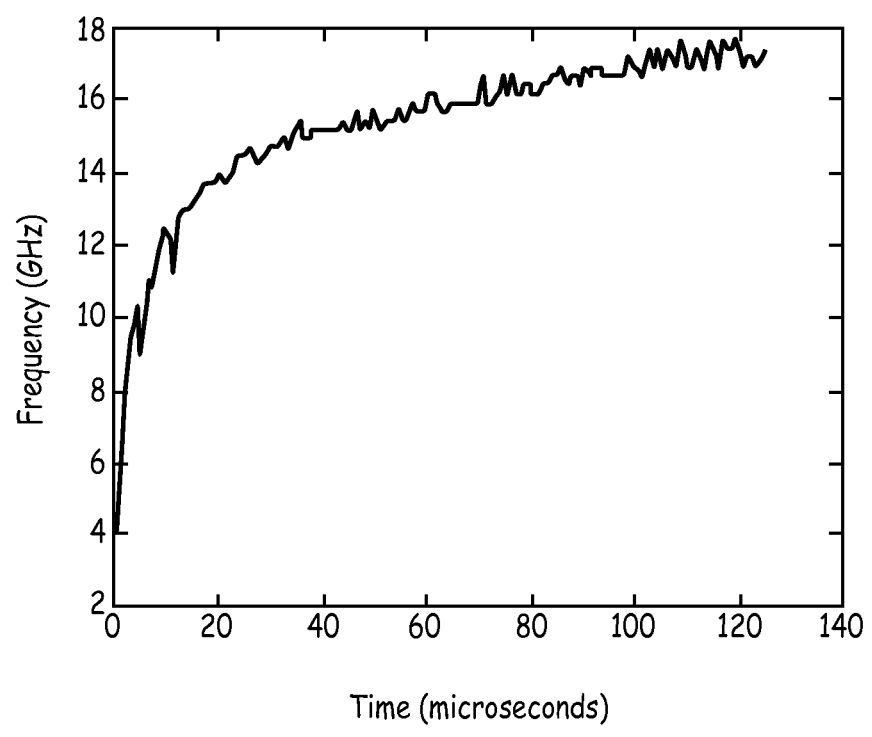
FIG. 2 depicts an exemplary response of an optical network unit laser to sudden temperature change.

However, in the system 100, each of the ONUs 112 is not transmitting continuously. Rather, each of the ONUs 112 transmits in bursts. Thus, the respective laser 114 of each ONU 112 transitions between an on state in which it transmits and an off state in which it is not transmitting. There is a sudden temperature change in the respective laser 114 when beginning to transmit after having been in the off state. The lasers 114 of the ONUs 112 are typically sensitive to temperature changes. That is, the wavelength of the lasers 114 in the ONUs 112 changes as function of the temperature change. For example, FIG. 2 depicts an exemplary response of an ONU laser to the sudden temperature change when beginning to transmit after having been in the off state. As can be seen in FIG. 2, the frequency in GigaHertz changes sharply in the first few microseconds after turning on the laser due to the change in temperature associated with turning on the laser. The frequency change then begins to level off or stabilize as time passes. As known to one of skill in the art, the wavelength is associated with the frequency by the known function, $f\lambda=c$ (frequency times wavelength equals the speed of light). Thus, the wavelength changes sharply in the few first microseconds as well. This rapid change in wavelength is also referred to as short term spectral excursion. Two problems associated with short term spectral excursion are that each burst may start and/or finish at the wrong wavelength.

Figure 3:
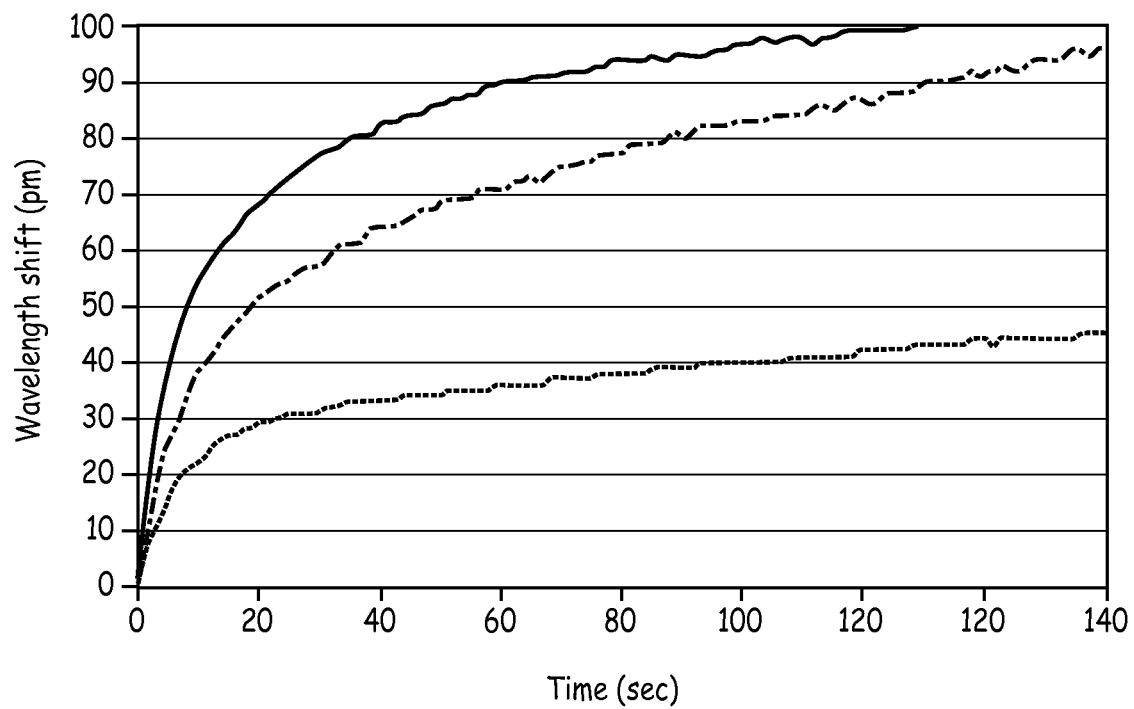
FIG. 3 depicts exemplary responses of lasers at different wavelengths to a slow change in temperature as the lasers transmit.

Similarly, as the respective laser 114 remains on to transit, there is a slow change in temperature which also affects the wavelength. For example, FIG. 3 depicts exemplary responses of lasers at different wavelengths to the slow change in temperature as the lasers 114 transmit bursts. This relatively slow change compared to the short term spectral excursion is also referred to herein as long term spectral excursion. As can also be seen in FIG. 3, the wavelength of the lasers 114 changes over time with the change in temperature. Since it is desired to have low cost ONUs 112, in some embodiments, a device to control the change in temperature, such as a TEC is not included with the ONUs 112. Thus, in some such embodiments, in order to counteract the effects of the wavelength change, the ONUs 112 are configured to pre-bias the wavelength of the lasers 114 such that after the wavelength change, the laser is transmitting at or within some tolerance level of the desired wavelength.

For example, if it is determined that the sudden and/or slow change in temperature causes the respective laser 114 to shift wavelength by 0.3 nm in a given direction (e.g. shorter or longer), then the laser is pre-biased, in some embodiments, to begin transmitting approximately 0.15 nm in the opposite direction from the desired wavelength. By wavelength biasing the laser, the transmitted burst will remain within an allowed wavelength range despite the wavelength shift discussed above. For example, in some embodiments, an allowed range or window (also referred to herein as the tolerance level) is ±0.2 nm of the desired wavelength. If a laser is configured to transmit at the center of that window, a 0.3 nm shift due to spectral excursion will push the burst out of the allowed range. Thus, by wavelength biasing the laser in the opposite direction of the wavelength shift due to spectral excursion, the burst will remain within the allowed range. In the above example, wavelength biasing the laser to begin transmitting 0.1 nm or 0.15 nm from the center of the window will maintain the optical burst within the allowed range despite the wavelength shift of 0.3 nm due to spectral excursion in the above example. In some such embodiments, the OLT 104 is used to pre-bias the respective ONUs 112.

In particular, in some embodiments, a respective quiet window is used for each of the ONUs 112 to control and pre-bias the respective lasers 114. During a quiet window, any unknown ONUs can transmit so that the OLT 104 can discover which ONUs are on the system. The quiet window is assigned by the OLT 104 and is typically used for ranging so that the OLT 104 can determine how far away from the OLT 104 each ONU 112 is located. The length of each quiet window can last up to 500 microseconds, for example. After ranging, the OLT 104 sends each ONU 112 an upstream transmission schedule which tells each ONU 112 when it can transmit upstream. As stated above, in some embodiments, the quiet window is also used by the OLT 104 to pre-bias the respective ONU 112 to compensate for the short and/or long term spectral excursion. In particular, the OLT 104 can use the signals used for ranging to measure wavelength shift due to spectral excursion for each ONU 112. The OLT 104 can then communicate with the respective ONU 112 to wavelength bias the laser in the respective ONU 112. In addition, the OLT 104 can schedule periodic measurement transmit slots for one or more of the ONUs 112 to update the measurement of wavelength shift and the corresponding wavelength bias.

For example, during a periodic measurement transmit slot, an ONU 112 turns on its laser 114 and leaves the laser 114 on for a period of time to allow the OLT 104 to measure the power of the optical signal transmitted by the respective ONU 112. In some embodiments, the ONU 112 leaves the laser 114 turned on throughout the entire respective measurement transmit slot. Thus, the ONU 112 transmits for a sufficient amount of time for the laser 114 to become relatively stable. In other words, the laser 114 of the ONU 112 is turned on long enough for the change in wavelength due to the temperature change caused by turning on the laser 114 (i.e. short and/or long term spectral excursion) to approximately cease.

The OLT 104 is configured to measure the power of the light or laser beam received from the ONU 112 corresponding to the measurement transmit slot. In addition to or in lieu of measuring power during a quiet window for initial ranging or during a respective measurement transmit slot, the OLT 104 can also be configured to measure the power of the optical burst signal received from the ONUs 112 during time slots assigned to the respective ONUs 112 for transmitting data.

After measuring and observing the behavior of an optical signal from a respective ONU 112, either during a quiet window or at other times, the OLT 104 then sends signals to the ONU 112 to instruct the ONU 112 to adjust the wavelength of the transmitted light beam. For example, in some embodiments, each of the ONUs 112 includes a heater 116 which can be used to adjust the wavelength of the transmitted light. Hence the OLT 104 sends signals to cause the ONU 112 to adjust the current to the heater 116 which causes a change in the wavelength of the light beam transmitted by the ONU 112. The OLT 104 continues to monitor the power of the light beam received from the ONU 112 and send signals to adjust the wavelength until the power of the light beam received from the ONU 112 reaches a desired shape over time at the OLT 104. For example, each receiver 107 of the OLT 104 is configured to receive a light beam at a given wavelength. Thus, the OLT 104 instructs each ONU 112 to make adjustments to the transmitted wavelength until the power over time reaches a desired shape for the corresponding receiver 107 which is receiving the light beam.

Figure 4:
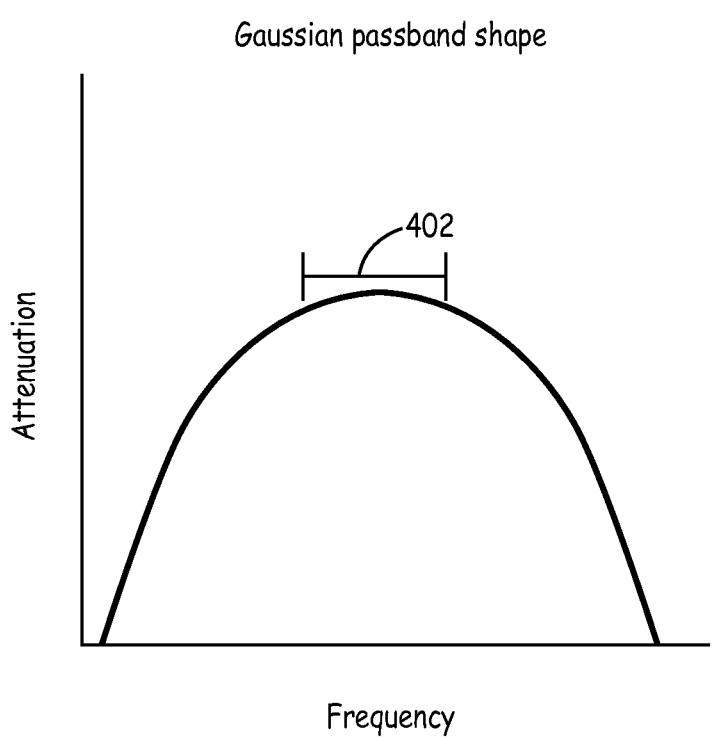
FIG. 4 depicts an exemplary Gaussian passband filter response.

For example, as described above, the adjustments can pre-bias the ONU 112 so that the center of optical bursts is at the correct wavelength. This reduces the degradation of the signal at the middle of the burst and moves the degradation to the beginning of the burst. These adjustments can be made periodically, as mentioned above, to update the bias and keep the power level of the transmitted optical burst within the allowed range. For example, each receiver 107 includes a passband filter to attenuate the power of signals based on frequency. In this way, each receiver 107 is configured for a specific frequency and its associated wavelength. FIG. 4 depicts an exemplary Gaussian passband filter response. As can be seen, the region 402 corresponds to the least attenuation. Hence, it is desirable for the optical burst from an ONU 112 to be centered on the region 402 to reduce attenuation of the signal.

While monitoring an optical signal, the respective receiver 107 in the OLT 104 can see the power level of the received optical signal change as the wavelength of the signal changes. For example, if the optical signal begins transmitting at the left of the Gaussian passband and shifts to the right, the observed power will increase as the wavelength shift causes the frequency to move to the right of the graph. If the wavelength continues to shift past the center of region 402, the observed power level will decrease. Thus, by observing the pattern of the power level changes, the receiver 107 is able to determine on which side of region 402 the respective ONU 112 began transmitting and in which direction it was shifting. The OLT 104 uses this information to then send a control signal to the respective ONU 112 to wavelength bias the ONU 112.

After being wavelength biased, the effects of short and/or long term spectral excursions are partially or completely compensated by the bias. That is, each respective ONU 112 is configured to start transmitting at a bias wavelength that is separated from the desired wavelength for that respective ONU 112 by a wavelength offset. The wavelength offset is determined based on the monitored wavelength shift when the laser initiates monitored burst transmissions, such as during the initial quiet period, measurement transmit slots, or data transmit slots, for example. Thus, the effects of the short and/or long term spectral excursion particular to that respective ONU 112 shift the transmitted wavelength from the bias wavelength of the respective ONU 112 to a wavelength at or near the desired wavelength for the respective ONU 112.

In addition, during operation, the respective laser 114 of a given ONU 112 may shift to a shorter or longer wavelength when transmitting signals. The biasing discussed above helps the OLT 104 respond to those shifts more efficiently. For example, the OLT 104 detects the shift based on changes in the power level of the signal received at the corresponding receiver 107 of the OLT 104, as discussed above with respect to FIG. 4. For example, if the wavelength shifts to the right or left of region 402, the power begins to decrease. Without additional knowledge, the OLT 104 would not know if a decrease in power was due to the wavelength shifting to a longer wavelength or to a shorter wavelength. In other words, the OLT 104 does not know if the frequency is moving to the right or left of FIG. 4.

However, the biasing discussed above helps the OLT 104 know which direction the wavelength shift is moving. In particular, based on the monitoring performed during a measurement transmit slot, for example, the OLT 104 knows if the respective ONU 112 has been biased to a shorter or longer wavelength. For example, if the respective ONU 112 was biased to a shorter wavelength (higher frequency to the right of the region 402), an increase in power indicates that the light beam has shifted to a longer wavelength and a decrease in power indicates that the light beam has shifted to a shorter wavelength. Thus, by monitoring the power level of the light beam received from the respective ONU 112, the OLT 104 can determine if the respective ONU 112 is shifting to a shorter or longer wavelength. The OLT 104 can then send signals to the ONU 112 accordingly to compensate for undesired shifts in the wavelength.

Additionally, in some embodiments, each of the ONUs 112 is configured to adjust the preamble of transmitted data based on preamble control signals received from the OLT 104. As understood by one of skill in the art, a preamble, also referred to as a header, is part of a transmission which can include address information, data related to the payload, and/or can be used for synchronization, etc. In some embodiments, each of the ONUs 112 increases the length of the preamble to aid in compensating for the short and/or long term spectral excursion discussed above. For example, the length of the preamble can be increased so that most of the degradation due to the spectral excursion occurs during the preamble. For example, based on monitored power, during a quiet period or at other moments, the length of the preamble can be determined so that the preamble ends when the wavelength shift has moved the optical burst into or near the region 402 of FIG. 4. This way the attenuation mostly affects the preamble and not the rest of the signal. In some embodiments, the preamble is lengthened by including an additional bit pattern at the beginning of the preamble, such as a bit pattern used for synchronization. The bit pattern is configured to have a length sufficient that most of the degradation due to spectral excursion occurs during the bit pattern. Thus, the length of the bit pattern is selected based on the changes in power level that are monitored during the respective quiet period, a measurement transmit slot or at other moments.

In other embodiments, the ONU 112 simply turns on the laser without modulating the signal for a specified period of time as part of the preamble and then begins transmitting the data portion of the preamble after the specified period of time. The period of time for turning on the laser without modulating the signal is selected such that most of the degradation due to spectral excursion occurs during the specified period of time. In some embodiments, the OLT 104 determines the approximate amount of time over which most of the spectral excursion occurs before beginning to stabilize. The OLT 104 then uses this determined amount of time to provide control signals to the respective ONU 112 in order to configure the length of the specified period of time without modulation or the length of the bit pattern included in the preamble by the respective ONU 112. In this way, the degradation due to spectral excursion mostly occurs prior to the transmission of data by the ONU 112.

Figure 5:
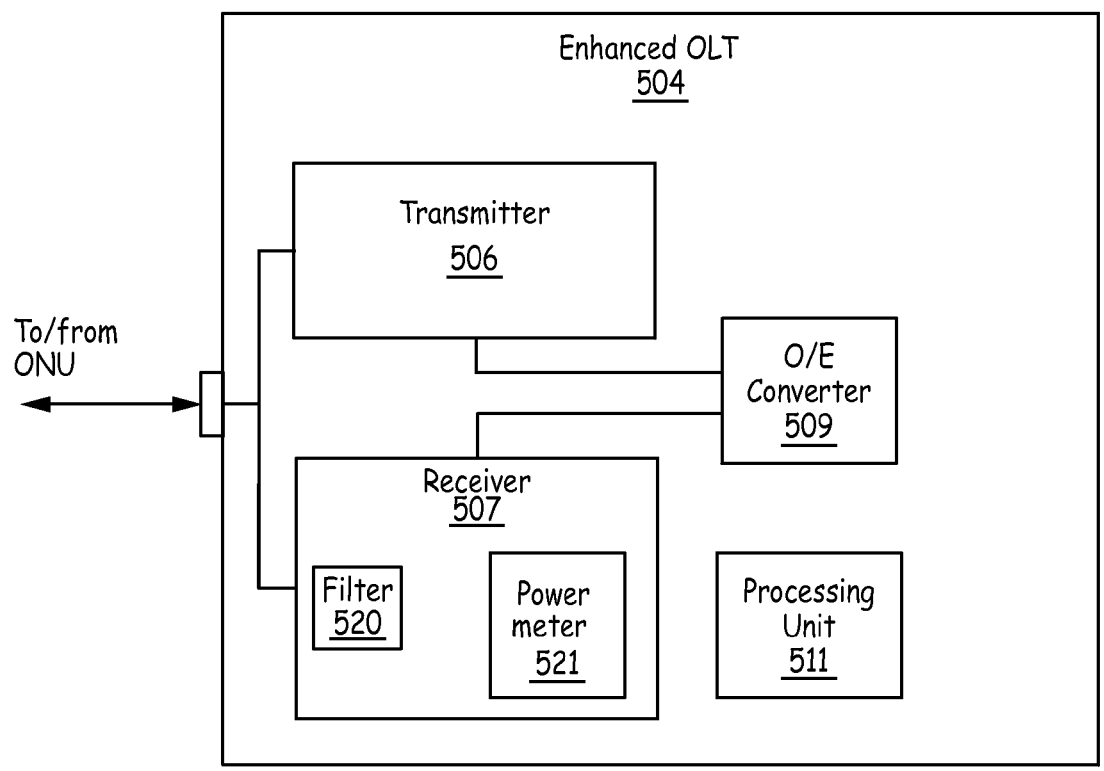
FIG. 5 is a high level block diagram of one embodiment of an enhanced optical line terminal.

FIG. 5 is a high level block diagram of one embodiment of an enhanced optical line terminal 504. It is to be understood that the OLT 504 is provided by way of example and not by way of limitation. For example, the OLT 504 can include other components not shown for purposes of explanation. The enhanced OLT 504 can be used in a network such as network 100. The enhanced OLT 504 includes at least one transmitter 506 configured to transmit optical signals and at least one receiver 507 configured to receive optical signals. Each receiver 507 includes a filter 520 and power meter 521. The filter 520 is a passband filter which attenuates signals not in the allowed passband. Thus, each receiver 507 is configured for a specific frequency/wavelength. The power meter 521 is configured to measure the power level of optical signals received form an optical network unit that is optically coupled to the respective receiver 507. The OLT 504 also includes an optical to electrical converter 509 which is configured to convert optical signals to electrical signals and to converter electrical signals to optical signals.

The OLT 504 also includes a processing unit 511. The processing unit 511 is configured to assign a quiet window to an optical network unit that is optically coupled to the optical OLT 504. The processing unit 511 is further configured to monitor changes in power level of an optical signal received from the optical network unit and measured by the power meter 521, such as during the initial quiet window for example. The processing unit 511 is configured to send control signals via the optical transmitter 506 to the optical network unit to direct the optical network unit to adjust the wavelength of the optical signal based on the monitored changes in power level, as discussed above. The control signals bias the optical network unit to a biased wavelength which is separated from a desired wavelength by a wavelength offset. The wavelength offset is related to the monitored changes in power level, as discussed above. In other words, the wavelength offset shifts the initial wavelength of the burst transmission in a direction opposite to the changes due to spectral excursion. The biased initial wavelength is not the desired wavelength for the receiver in the OLT. However, by biasing to the biased initial wavelength, the degradation due to spectral excursion is shifted to other parts of the signal, such as at the beginning during the preamble.

Figure 6:
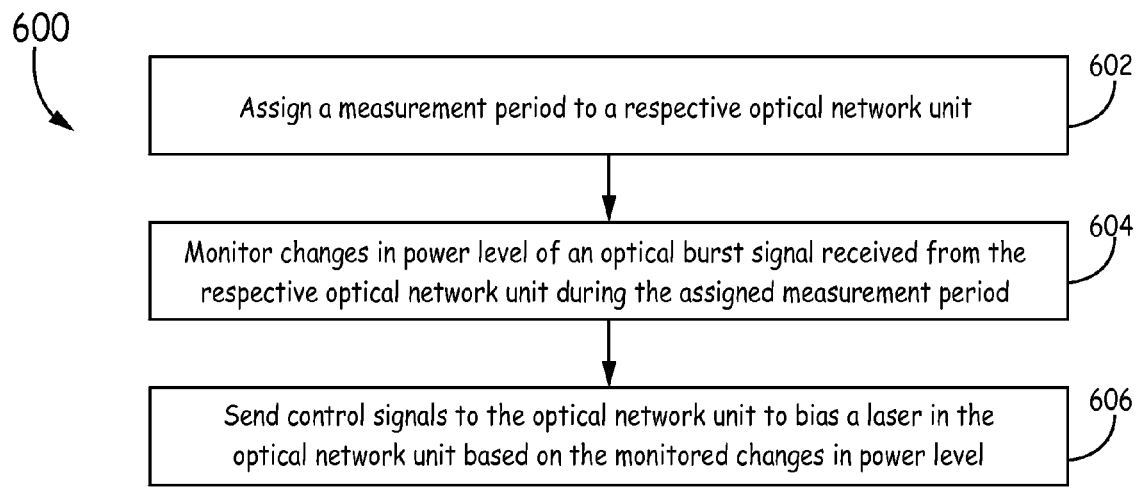
FIG. 6 is a flow chart depicting one embodiment of an exemplary method of compensating for spectral excursion in an optical network.

FIG. 6 is a flow chart depicting one embodiment of an exemplary method 600 of compensating for spectral excursion in an optical network such as network 100. Method 600 can be implemented by an optical line terminal, such as optical line terminal 104 or 504. At block 602, a measurement period is assigned to a respective optical network unit. The measurement period can be an initial quiet period during which ranging is performed. The measurement period can also be periodic measurement transmit slots during which data is not sent from the ONU, but the slot is used to measure power levels of the ONU. In addition, the measurement period can be an assigned time slot during which the ONU transmits data in optical bursts to an optical line terminal. At block 604, changes in power level of an optical signal received from the respective optical network unit during the assigned measurement period are monitored. Thus, the measurement period is used to determine characteristics of the optical signal and its response to burst transmissions. In particular, the receiver in the optical line terminal is looking for a signal from the optical network unit at a particular wavelength. The power or amplitude of the optical signal will, thus, be highest when the optical signal is transmitted at or near the expected or desired wavelength. By monitoring how the power changes when a burst is initiated, the short and/or long term spectral excursion can be characterized. It is to be understood that monitoring the power level is not limited to quiet periods and can be performed at other times as well, as discussed above.

At block 606, control signals are sent to the optical network unit to bias a laser of the optical network unit in order to compensate for undesired changes in the wavelength, such as the spectral excursion discussed above. In some embodiments, the control signals cause the optical network unit to adjust the initial wavelength of the optical signal based on the monitored changes in power level. In particular, the control signals cause the optical network unit to shift the initial wavelength of an optical signal burst in a direction opposite to the monitored wavelength changes based on the changes in power level. For example, if the monitored changes in power level indicate that the wavelength is shifting to a longer wavelength, the control signals can cause the optical network unit to shift to a shorter wavelength to compensate for the undesired wavelength shift, as discussed above.

In addition, in some embodiments, the optical network unit is not able to identify the specific wavelength at which it is transmitting and/or is not able to tune over the entire frequency band. In some such embodiments, the optical network unit includes a heater which can affect the transmitted wavelength. Thus, the control signals direct the optical network unit to adjust current to the heater in order to change the transmitted wavelength in response to the spectral excursion experienced when turning on the laser. As discussed above, the optical line terminal sends control signals to direct the change in wavelength based on the measured/monitored power level of the signal being received, such as the level monitored during a quiet window. After the adjustments are made, the optical network unit is biased to compensate for the spectral excursion, as discussed above.

In other embodiments, the control signals direct the optical network unit to wavelength bias its respective laser by increasing the length of the preamble for burst transmissions. The respective increased length is based on the respective monitored changes for each respective ONU. That is, in some embodiments, the preamble is increased to permit time for the wavelength to stabilize such that the majority of the spectral excursion occurs during the preamble, as discussed above In some embodiments, the preamble is lengthened by including a bit pattern at the beginning of the preamble. The length of the bit pattern is selected based on the monitored changes in power level. That is, the length is determined to permit sufficient time for the wavelength of the light beam to stabilize. However, in some embodiments, the wavelength shift due to spectral excursion does not stabilize during an optical burst. Thus, the preamble can be selected such that the portion of the signal suffering the most degradation due to the spectral excursion is the preamble. For example, the length of the preamble is selected such that as the wavelength shifts, portions of the preamble are transmitted at a wavelength outside the passband of the receiver in the OLT, but the contents of the optical burst will be transmitted within the passband. In other embodiments, the preamble is lengthened by turning the laser on at the beginning of the preamble without modulating the laser for a specified period of time. The specified period of time without modulation is determined so that the degradation due to the wavelength shift occurs only during the beginning of the optical burst.

Hence, the embodiments described herein enable the use of low cost tunable lasers in optical network units. For example, in some embodiments, the optical line terminal takes advantage of a quiet window typically used for ranging to also wavelength bias the low cost lasers in order to compensate for spectral excursions experienced in burst transmissions. Thus, more expensive components used to maintain a specific wavelength can be omitted and, thereby, reduce costs of the optical network units. In addition, colorless ONUs can be used. In particular, the ONUs can be uncalibrated ONUs. As used herein, uncalibrated means that the ONUs are not aware of the wavelength at which they are transmitting. In some embodiments, the ONUs have limited ability to tune over a portion of the entire frequency band. Hence, these features also reduce the cost associated with the ONUs.

EXAMPLE EMBODIMENTS

Example 1 includes an optical network comprising: an optical line terminal having one or more transmitters configured to transmit optical signals and one or more receivers configured to receive optical signals, wherein each of the one or more transmitters and each of the one or more receivers is configured to operate over a respective wavelength; a plurality of optical network units, each of the optical network units having a respective laser that is optically coupled to a respective one of the one or more receivers in the optical line terminal; wherein the optical line terminal is configured to monitor power levels of respective optical signal burst transmissions from each of the plurality of optical network units and to direct each optical network unit to wavelength bias its respective laser between optical signal bursts based on the monitored power levels to compensate for a respective wavelength shift experienced by the respective laser during burst transmissions.

Example 2 includes the optical network of Example 1, wherein each of the optical network units is uncalibrated and configured to tune the respective laser over a fraction of the frequency band.

Example 3 includes the optical network of any of Examples 1-2, wherein the optical line terminal is configured direct each optical network unit to bias its respective laser by adjusting an initial burst transmission wavelength by a respective wavelength offset.

Example 4 includes the optical network of any of Examples 1-3, wherein each of the optical network units includes a heater used to tune the respective laser.

Example 5 includes the optical network of any of Examples 1-4, wherein the optical line terminal is configured to direct each of the optical network units to bias its respective laser by increasing the length of a preamble for optical signal burst transmissions based on the monitored power levels.

Example 6 includes the optical network of any of Examples 1-5, wherein the optical line terminal is configured to direct each of the optical network units to bias its respective laser by including a bit pattern at the beginning of a preamble to increase the length of the preamble for optical signal burst transmissions.

Example 7 includes the optical network of any of Examples 1-6, wherein the optical line terminal is configured to direct each of the optical network units to bias its respective laser by turning on its respective laser without modulation at the beginning of a preamble to increase the length of the preamble for optical signal burst transmissions.

Example 8 includes the optical network unit of any of Examples 1-7, wherein the optical line terminal is configured to monitor the power levels of optical signal burst transmissions from each of the optical network units during respective quiet windows.

Example 9 includes a method of compensating for spectral excursion in an optical network, the method comprising: assigning a measurement period to an optical network unit; monitoring changes in power level of an optical burst signal received from the optical network unit during the assigned measurement period; and sending control signals to the optical network unit to wavelength bias a laser of the optical network unit in order to compensate for undesired changes in the wavelength of optical burst signals from the optical network unit based on the monitored changes in power level.

Example 10 includes the method of Example 9, wherein the control signals cause the optical network unit to adjust an initial wavelength of optical burst signals by adjusting current to a heater element in the optical network unit.

Example 11 includes the method of any of Examples 9-10, further wherein the control signals direct the optical network unit to increase the length of a preamble for optical burst signals, wherein the increased length of the preamble is based on the monitored changes in power level.

Example 12 includes the method of Example 11, wherein the control signals direct the optical network unit to include a bit pattern having a specified length at the beginning of the preamble to increase the length of the preamble, the specified length of the bit pattern based on the monitored changes in power level.

Example 13 includes the method of any of Examples 11-12, wherein the control signals direct the optical network unit to turn on the laser without modulation for a specified period of time at the beginning of the preamble to increase the length of the preamble, the specified period of time determined based on the monitored changes in power level.

Example 14 includes the method of any of Examples 9-13, wherein the control signals direct the optical network unit to bias the laser such that degradation of optical burst signals from the optical network unit due to the wavelength shift occurs only during the beginning of the optical burst signals.

Example 15 includes an optical line terminal comprising; an optical transmitter configured to transmit optical signals; an optical receiver configured to receive optical signals, wherein the optical receiver includes a power meter configured to measure power levels of received optical burst signals; an optical to electrical converter coupled to the optical transmitter and to the optical receiver, the optical to electrical converter configured to convert optical signals to electrical signals and to convert electrical signals into optical signals; and a processing unit coupled to the optical transmitter and to the optical receiver via the optical to electrical converter; wherein the processing unit is configured to assign a measurement period to an optical network unit that is optically coupled to the optical receiver, the processing unit further configured to monitor changes in power level of an optical burst signal received from the optical network unit and measured by the power meter during the assigned measurement period; wherein the processing unit is configured to send control signals via the optical transceiver to the optical network unit to direct the optical network unit to adjust a laser in the optical network unit based on the monitored changes in power level in order to compensate for undesired changes in the wavelength of optical burst signals from the optical network unit.

Example 16 includes the optical line terminal of Example 15, wherein the processing unit is configured to send control signals to direct the optical network unit to adjust current to a heater element in the optical network unit in order to adjust an initial wavelength of the optical burst signals based on the monitored changes in power level.

Example 17 includes the optical line terminal of any of Examples 15-16, wherein the processing unit is configured to send control signals to the optical network unit to direct the optical network unit to increase the length of a preamble for the optical burst signals, wherein the increased length of the preamble is based on the monitored changes in power level.

Example 18 includes the optical line terminal of Example 17, wherein the control signals direct the optical network unit to include a bit pattern having a specified length at the beginning of the preamble to increase the length of the preamble, the specified length of the bit pattern based on the monitored changes in power level.

Example 19 includes the optical line terminal of any of Examples 17-18, wherein the control signals direct the optical network unit to turn on the laser without modulation for a specified period of time at the beginning of the preamble to increase the length of the preamble, the specified period of time determined based on the monitored changes in power level.

Example 20 includes the optical line terminal of any of Examples 15-19, wherein the control signals direct the optical network unit to bias the laser such that degradation of optical burst signals from the optical network unit due to the undesired changes in wavelength occurs only during the beginning of the optical burst signals.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical network comprising:
  an optical line terminal having one or more transmitters configured to transmit optical signals and one or more receivers configured to receive optical signals, wherein each of the one or more transmitters and each of the one or more receivers is configured to operate over a respective wavelength;
  a plurality of optical network units, each of the optical network units having a respective laser that is optically coupled to a respective one of the one or more receivers in the optical line terminal;
  wherein the optical line terminal is configured to monitor power levels of respective optical signal burst transmissions from each of the plurality of optical network units and to direct each optical network unit to wavelength bias its respective laser in an direction away from the respective wavelength between optical signal bursts based on the monitored power levels to compensate for a respective wavelength shift experienced by the respective laser during burst transmissions.

2. The optical network of claim 1, wherein each of the optical network units is uncalibrated and configured to tune the respective laser over a fraction of the frequency band.

3. The optical network of claim 1, wherein the optical line terminal is configured direct each optical network unit to bias its respective laser by adjusting an initial burst transmission wavelength by a respective wavelength offset.

4. The optical network of claim 1, wherein each of the optical network units includes a heater used to tune the respective laser.

5. The optical network of claim 1, wherein the optical line terminal is configured to direct each of the optical network units to bias its respective laser by increasing the length of a preamble for optical signal burst transmissions based on the monitored power levels.

6. The optical network of claim 1, wherein the optical line terminal is configured to direct each of the optical network units to bias its respective laser by including a bit pattern at the beginning of a preamble to increase the length of the preamble for optical signal burst transmissions.

7. The optical network of claim 1, wherein the optical line terminal is configured to direct each of the optical network units to bias its respective laser by turning on its respective laser without modulation at the beginning of a preamble to increase the length of the preamble for optical signal burst transmissions.

8. The optical network unit of claim 1, wherein the optical line terminal is configured to monitor the power levels of optical signal burst transmissions from each of the optical network units during respective quiet windows.

9. A method of compensating for spectral excursion in an optical network, the method comprising:
  assigning a measurement period to an optical network unit;
  monitoring changes in power level of an optical burst signal received from the optical network unit during the assigned measurement period; and
  sending control signals to the optical network unit to wavelength bias a laser of the optical network unit in an direction away from an operating wavelength of the optical network between optical signal bursts in order to compensate for undesired changes in the wavelength of optical burst signals from the optical network unit based on the monitored changes in power level.

10. The method of claim 9, wherein the control signals cause the optical network unit to adjust an initial wavelength of optical burst signals by adjusting current to a heater element in the optical network unit.

11. The method of claim 9, further wherein the control signals direct the optical network unit to increase the length of a preamble for optical burst signals, wherein the increased length of the preamble is based on the monitored changes in power level.

12. The method of claim 11, wherein the control signals direct the optical network unit to include a bit pattern having a specified length at the beginning of the preamble to increase the length of the preamble, the specified length of the bit pattern based on the monitored changes in power level.

13. The method of claim 11, wherein the control signals direct the optical network unit to turn on the laser without modulation for a specified period of time at the beginning of the preamble to increase the length of the preamble, the specified period of time determined based on the monitored changes in power level.

14. The method of claim 9, wherein the control signals direct the optical network unit to bias the laser such that degradation of optical burst signals from the optical network unit due to the wavelength shift occurs only during the beginning of the optical burst signals.

15. An optical line terminal comprising;
  an optical transmitter configured to transmit optical signals;
  an optical receiver configured to receive optical signals, wherein the optical receiver includes a power meter configured to measure power levels of received optical burst signals;
  an optical to electrical converter coupled to the optical transmitter and to the optical receiver, the optical to electrical converter configured to convert optical signals to electrical signals and to convert electrical signals into optical signals; and
  a processing unit coupled to the optical transmitter and to the optical receiver via the optical to electrical converter;
  wherein the processing unit is configured to assign a measurement period to an optical network unit that is optically coupled to the optical receiver, the processing unit further configured to monitor changes in power level of an optical burst signal received from the optical network unit and measured by the power meter during the assigned measurement period;

wherein the processing unit is configured to send control signals via the optical transceiver to the optical network unit to direct the optical network unit to adjust a laser in the optical network unit in a direction away from an operating wavelength of the optical network between optical signal bursts based on the monitored changes in power level in order to compensate for undesired changes in the wavelength of optical burst signals from the optical network unit.

16. The optical line terminal of claim 15, wherein the processing unit is configured to send control signals to direct the optical network unit to adjust current to a heater element in the optical network unit in order to adjust an initial wavelength of the optical burst signals based on the monitored changes in power level.

17. The optical line terminal of claim 15, wherein the processing unit is configured to send control signals to the optical network unit to direct the optical network unit to increase the length of a preamble for the optical burst signals, wherein the increased length of the preamble is based on the monitored changes in power level.

18. The optical line terminal of claim 17, wherein the control signals direct the optical network unit to include a bit pattern having a specified length at the beginning of the preamble to increase the length of the preamble, the specified length of the bit pattern based on the monitored changes in power level.

19. The optical line terminal of claim 17, wherein the control signals direct the optical network unit to turn on the laser without modulation for a specified period of time at the beginning of the preamble to increase the length of the preamble, the specified period of time determined based on the monitored changes in power level.

20. The optical line terminal of claim 15, wherein the control signals direct the optical network unit to bias the laser such that degradation of optical burst signals from the optical network unit due to the undesired changes in wavelength occurs only during the beginning of the optical burst signals.

* * * * *